Jan. 19, 1954
E. D. TILLYER
2,666,362
VARIABLE LIGHT-MODIFYING DEVICE FOR PHASE CONTRAST
Filed July 29, 1949
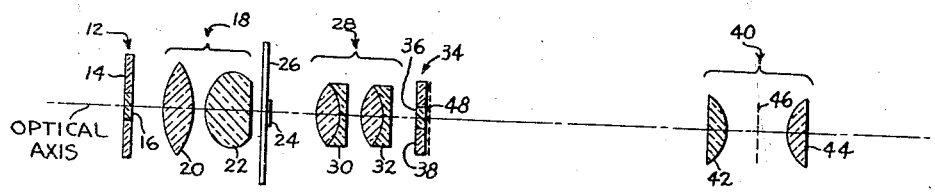
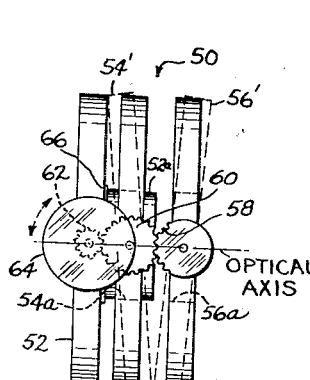
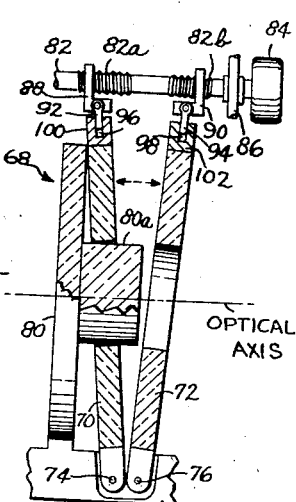
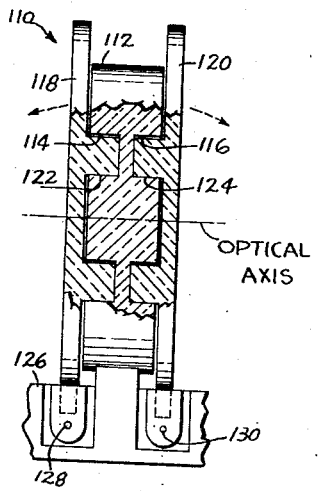
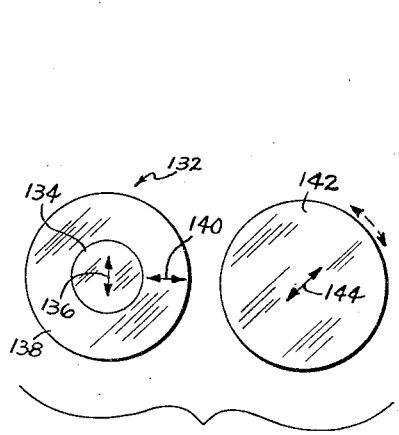
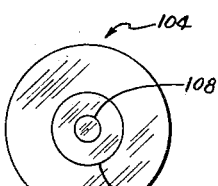
INVENTOR
EDGAR D. TILLYER
BY
ATTORNEYS Patented Jan. 19, 1954

2,666,362

UNITED STATES PATENT OFFICE 2,666,362

VARIABLE LIGHT-MODIFYING DEVICE FOR PHASE CONTRAST

Edgar D. Tillyer, Southbridge, Mass., assignor to American Optical Company, Southbridge, Mass., a voluntary association of Massachusetts Application July 29, 1949, Serial No. 107,527

8 Claims. (Cl. 88—39)

This invention relates to optical elements, devices, and systems for obtaining gradual contrast effects in images of objects. More particularly, the invention relates to such optical means when incorporated with a microscope, for viewing structural differences in specimens which are not clearly perceptible through usual methods of microscopy.

An object or specimen of a type considered herein may be regarded as constituting a plurality of particles and surrounding regions, a given particle and the adjacent surround presenting, for example, a small difference of optical path (thickness times refractive index) or a small transmission difference, or both. For clarity of explanation, a single particle and its surround and the relation and control of light rays directed upon and emanating therefrom will be considered.

Known methods of what is commonly termed "phase microscopy" involve optical path and/or transmission differences in different regions of a specimen and the introduction of retardation or absorption components in an optical system. These components serve to modify the phase and amplitude differences existing between undeviated and deviated light rays emanating from said regions to provide desired contrast effects in a visible image of the specimen. It has been considered of advantage to effect the aforesaid modifications of phase and amplitude in a continuous manner throughout a predetermined range so that a wide variety of contrast effects may be obtained. The present invention relates particularly to this aspect of the method and employs novel means for the purpose which are believed to possess certain advantages relating to simplicity of construction, ease of operation and accuracy of imagery when employed with conventional lens components. Said constructions basically involve the employment of a plurality of complementary, adjustable transparent plate-like elements predeterminedly located in the optical system and capable of having their effective thickness altered. The present invention places particular emphasis upon the use of a pair of predeterminedly angularly adjustable plate-like elements for avoiding undesirable obliquity effects in the visible image when nonparallel light is employed. Such effects would be produced by a single tilted plate excepting when in parallel light. Said pair of plates would also correct for oblique components in substantially parallel light. The invention also contemplates the combination therewith of light-polarizing elements for effecting amplitude variations of the light rays.

Although a diaphragm is shown and described herein as a preferred means for admitting light to an optical system and for controlling the dimensions and contour of light, other means may be employed for a generally similar purpose. The term "light," as used herein, is not necessarily restricted to those wave lengths of radiant energy to which the human eye is sensitive but may comprise other forms of radiant energy including those in the invisible portions of the spectrum. Accordingly, any suitable primary or secondary light source may be utilized in the optical systems of the invention. The use of a diaphragm in the optical system provides a secondary light source and is thus considered as falling within the meaning of the term "light source." An adjustable diaphragm such as an iris diaphragm could also suitably be employed for varying the dimensions of the light aperture in the interests of improved imaging of an object. Other light sources which could be positioned or effectively positioned at a location similar to that of the diaphragm shown and which are contemplated by the invention comprise an incandescent filament, a fluorescent element, a reflecting surface, or the image of a filament, of a light aperture or of some other source of radiant energy.

An object of the invention is to provide a variable optical device or system which is capable of gradually altering contrast effects in the image of an object under observation to better expose structural differences existing therein.

Another object of the invention is to provide a device of the character described which is particularly adapted to a microscope.

A further object of the invention is to provide an adjustable device which enables a gradual alteration of the phase and amplitude relationships existing between undeviated and deviated light rays emanating from an illuminated object.

Still another object of the invention is to provide a device of the character described embodying a simple and easily operated construction which basically involves the angular movement of a pair of plate-like members.

A still further object of the invention is to provide a device or system of the character described which permits accurate imagery without the necessity of incorporating specially corrected lenses in the system.

These and other objects of the invention will be apparent from the following description taken in connection with the accompanying drawings wherein like reference characters refer to like parts throughout the several views of which:

Figure 1 is a diagrammatic view of an optical system forming one embodiment of the invention;

Fig. 2 is a front detail view of a diaphragm suitable for use in the optical system;

Fig. 3 is a side elevation view of a light-modifying element of the invention;

Fig. 4 is a side elevation view, partly in cross-section and with parts broken away, of another light-modifying element of the invention;

Fig. 5 is a front detail view of another form of diaphragm which may be employed in the optical system;

Fig. 6 is a view similar to that of Fig. 4 of an alternative form of light-modifying element of the invention; and Fig. 7 is a front detail view of light-polarizing components which may be employed in the optical system.

Referring to Fig. 1, an optical system which may suitably be incorporated with a microscope is shown. A diaphragm 12, such as that shown in Fig. 2, having an opaque portion 14 and a clear portion or light aperture 16 of predetermined dimensions and contour is positioned adjacent an entrance pupil of the system for admitting light thereto. The diaphragm serves as a secondary light source, it being understood that an incandescent or other source of light is positioned to the left of the diaphragm, but not shown, and that lens means and/or light diffusing means may be positioned between the source of light and diaphragm 12 for insuring that light of a satisfactory quality is incident the diaphragm. A condenser 18, comprising elements 20 and 22, directs the light rays from aperture 16 upon an object or specimen 24 mounted upon a slide 26. An objective 28, comprising elements 30 and 32, is employed and an adjustable or variable light-modifying element 34 having a transparent zone 36 which is conjugate to aperture 16 of the diaphragm and a complementary transparent zone 38 is positioned adjacent the back focal plane of objective 28 or exit pupil of the system formed by said objective and condenser 18. Light from aperture 16 is normally focused upon zone 36. The detailed structure and adjustable features of the light-modifying element are omitted in Fig. 1, the same being shown in detail in other of the drawings. The system of Fig. 1 is completed by an eyepiece 40 comprising, for example, elements 42 and 44 and having an image plane 46. Dotted line 48 represents a plane, contiguous to element 34, at which various elements, presently to be described, may be positioned.

The conjugate zone 36 and complementary zone 38 of light-modifying element 34 are formed for respectively intercepting the undeviated light rays and the deviated light rays emanating from specimen 24 and for modifying at least one of the phase and amplitude differences which may exist between said rays, due to structural differences in the specimen. Basically, the light-modifying element, which is merely diagrammatically represented in Fig. 1 and shown in detail in Figs. 3, 4 and 6, comprises a pair of transparent preferably plane parallel plate-like components which are rotatably or tiltably mounted so that they may be variably inclined with respect to the optical axis in a gradual manner and, accordingly, may be varied in effective thickness and perform a gradual modification of the light rays passing therethrough. Thus, a plate-like component may be formed of a glass or a plastic, or of a glass having a suitable light-retarding coating which presents a greater optical path to the incident rays as it is increasingly rotated or tilted and permits gradual modification of the phase of said rays. Or the plate-like component may be formed of a light-absorbing glass or a plastic, or have deposited thereon a suitable absorptive coating such as a metal whereby the absorptivity is increased with increases of rotation or tilt of the component and a gradual variation of the amplitude of incident light rays is accomplished. Auxiliary light-polarizing means, presently to be described, are, however, preferred for the latter purpose.

In Fig. 3, a light-modifying element 50 is shown. Element 50 comprises a fixed, preferably circular, transparent plate-like component 52 of a given refractive index having a centrally projecting portion 52a. Mounting means for element 50 are omitted, it being understood that suitable means therefor may be provided in a carrying tube. Portion 52a forms the conjugate zone of the plate and surrounding portions form the complementary zone of said plate. The thickness of said portions as well as that of the various components, coatings and angles of inclination of components, shown herein is greatly exaggerated, the same being enlarged for clarity of explanation only. A second plate-like component 54 having a central aperture 54a is pivotally mounted adjacent component 52 and a third plate-like component 56 having a central aperture 56a is pivotally mounted contiguous component 54. It will be apparent that plates 54 and 56 occupy only the complementary zone inasmuch as apertures 54a and 56a occupy the conjugate zone. Components 54 and 56 are preferably so mounted as to be tiltable simultaneously to an equal degree but in opposite directions, each component thus always being oppositely inclined at an identical angle with respect to the optical axis. Other angular positions of components 54 and 56 are represented by dotted lines 54' and 56'. Any suitable means may be employed for rotating or tilting components 54 and 56. A gear sector 58 and gears 60 and 62, the latter being actuated by a knob 64, are shown for pivotally moving the plates simultaneously, as above described. A narrow opaque light-shielding ring 66 may be formed around plate portion 52a so that no undesirable "leak" of light rays between said portion and apertures 54a and 56a is permitted when components 54 and 56 are tilted.

Considering element 50 to be positioned in the optical system of Fig. 1 at the location of element 34 thereof, rotation of knob 64 provides a rotation of components 54 and 56 and alters the phase of the deviated light rays emanating from specimen 24 and incident said components. Accordingly, either reinforcing or destructive interference of the light rays forming the image of the particle may be performed and the particle may be represented either in bright or dark contrast with respect to the surround. Let it be assumed, for example, that all of the components are of similar refractive index and that the combined thickness of components 54 and 56 at the positions shown in Fig. 3, and taken longitudinally of the optical axis, is equal to that of projecting portion 52a of fixed component 52. Let it also be assumed that other portions of component 52 are of equal thickness throughout the conjugate and complementary zones. The aforesaid conditions provide zero relative retardation between the deviated and undeviated light rays. When components 54 and 56 are tilted the effective thickness of the complementary zone is increased, a relative retardation of the deviated light rays occurs, and dark contrast in the visible image may be achieved.

As a second example, let it be assumed that the refractive indices of the components are as above described but that the combined thickness of components 54 and 56 is such that their effective combined thickness is equal to that of projecting portion 52*a* at a predetermined angle of tilt of components 54 and 56. Said angle may be considered as midway between the position shown in Fig. 3 and that represented by dotted lines 54' and 56'. Accordingly, a further angular displacement of components 54 and 56 to the positions 54' and 56' would increase their effective thickness and produce a relative retardation of the deviated light incident the complementary zone and dark contrast of the particle in the image, while their movement in an opposite direction toward a 90° relation with the optical axis would decrease their effective thickness. In the last-named instance, a relative retardation of the undeviated light incident the conjugate zone would occur accompanied by bright contrast of the particle with respect to the surround. A satisfactory range of retardation properties of components 54 and 56 at different angles of inclination may extend, for example, from zero to plus or minus $.5\lambda$. This range may be increased or decreased as desired.

The employment of a pair of plates, namely, plates 54 and 56 for the purpose offers several distinct advantages. Inasmuch as each plate shares in varying the phase of the deviated light rays the degree of inclination necessary of each plate for a given alteration is appreciably less than that which would be required of a single plate. Moreover, if but a single plate were employed in other than parallel light, undesirable obliquity effects might impair the image. The construction involving two tiltable components may thus be considered as obviating the necessity of incorporating infinity corrected objectives or an anastigmatizing lens in the system where other than parallel light, or parallel light wherein some oblique rays are present, is utilized. Where constructional features make it desirable to further reduce the longitudinal dimensions of element 50, the material used in forming components 54 and 56 might be so chosen as to have a higher refractive index than that of component 52, components 54 and 56, accordingly, being relatively thinner than above described and thus adapted to be grouped more closely together.

Fig. 4 represents a light-modifying element 68 wherein the centrally apertured movable components 70 and 72 are pivoted at their extremities, as by pivot pins 74 and 76 mounted upon portions of a carrying tube 78 and are thus capable of angular variation with respect to fixed component 80 having projecting portion 80*a*. Any suitable means may be employed for actuating said movable components such as a screw 82 having reversely threaded portions 82*a* and 82*b* and an actuating knob 84 attached thereto, said screw being rotatably mounted and held against longitudinal movement, as in a support means 86. A pair of lugs 88 and 90 are threadedly engaged with said portions 82*a* and 82*b*. Arms 92 and 94 are pivotally connected to said lugs and are slidably inserted in slots 96 and 98 which are formed in rim portions 100 and 102 of plates 70 and 72. In operation, the element of Fig. 4 functions optically in a manner similar to that described relative to Fig. 3 and the various considerations above set forth relating to thickness, refractive index and angular position of the components of Fig. 3 also relate to those of Fig. 4.

In Fig. 5, a diaphragm 104 is shown having an annular clear portion or light aperture 106 and opaque portions 108. Diaphragm 104 may be positioned in the optical system of Fig. 1 at the location occupied by diaphragm 12 thereof where an annular bundle of light rays is preferred. A variable light-modifying element 110 of the type shown in Fig. 6 may appropriately be employed with diaphragm 104, said element being positioned in the system of Fig. 1 at the location of element 34. Element 110 comprises a fixed transparent component 112 having annular recessed portions 114 and 116 formed therein and a pair of tiltable transparent components 118 and 120 having annular protruding portions 122 and 124 formed, respectively, thereon. Components 118 and 120 are pivotally attached to fixed portions 126 of a carrying tube by pivot pins 128 and 130. Any suitable mechanism such as that shown in Figs. 3 and 4 may be employed for tilting components 118 and 120. Light from aperture 106 of diaphragm 104 is normally focused upon annular conjugate portions 114—116 and 122—124 of element 110. Tilting of components 118 and 120 may be employed to vary the effective thickness or optical path within conjugate portions 122 and 124 to provide zero retardation between the undeviated and deviated light rays at a predetermined angle of tilt. A plus or minus retardation of the undeviated light rays relative to the deviated rays may be obtained, as desired, by tilting the components in different directions from the zero position. Or, the zero angle may be established at the position shown in Fig. 6 and a plus retardation achieved by tilting the components away from said position. Various considerations relating to thickness and refractive indices of the components are similar to those described relative to Fig. 3, it being understood that optical path equals thickness times refractive index of a component and that said optical path may be varied with variations in the effective thickness of a tiltable component. Light sealing means such as ring 66 of Fig. 3 have been omitted from the constructions of Figs. 4 and 6 inasmuch as the protruding and recessed portions of the movable and fixed components could be specially shaped for close contact with one another at various positions.

Fig. 7 illustrates polarizing means which may be utilized in conjunction with the elements of Figs. 3, 4 and 6 when the latter are employed for phase modification. Said polarizing means may appropriately be formed of any known optically efficient polarizing sheet material and consists of a zonal polarizer 132 having a conjugate zone 134 with a direction of polarization 136, and a complementary zone 138 with a direction of polarization 140. The zonal polarizer may be constructed in any suitable manner as, for example, by bonding portions 134 and 138 to a transparent material such as glass. The angular relation of the directions is preferably at 90° although another angle may be employed. Polarizer 132 is preferably positioned adjacent the light-modifying element as, for example at plane 48 of Fig. 1. A second rotatable polarizer or analyzer 142, having a direction of polarization 144, may be located at any convenient position in the optical system, preferably between polarizer 132 and the exit pupil of said system. By rotating the analyzer, the differently polarized light emanating from the conjugate and complementary zones of polarizer 132 will be more or less transmitted by the analyzer according to the parallel or angular relation of the direction of polarization 144 with the directions 136 and 140 and the amplitude ratio of the undeviated and deviated light rays may thus be controlled. It will be apparent that analyzer 142 may be held stationary and that polarizer 132 may be rotated if preferred. Whereas efficient sheet polarizers usually extinguish approximately 99% of the incident light at the crossed or extinction position, it is contemplated herein that "partial" sheet polarizers having a maximum extinction of less than 99% may advantageously be employed in the interests of preventing an undesirable light loss while still enabling a sufficient amplitude modification for practical purposes. Partial polarizers are known to the art and polarizers producing less than 99% extinction as, for example, a combination of sheet polarizers producing 40% or greater extinction at the 90° crossed position are contemplated for the purpose.

In the examples shown herein, a preferred method of compensating for lateral displacement of the image, which would occur with a single tilted plate in other than parallel light, has been illustrated. Said method involves the inclining of two plates of equal thickness and refractive index in opposite directions through equal angles. It is possible, however, to thus correct for lateral displacement of an image by employing plates of unequal thickness or unequal refractive index, or both, by inclining one plate by a different amount than the other, as is well known in the art of linear measurement. Although the position of light-modifying element 34 is shown in Fig. 1 to be adjacent the exit pupil of condenser 18 and objective 28, it would be possible to employ auxiliary lenses in the system to provide other image planes at which individual components of the light-modifying device could be positioned. This might offer advantages where the longitudinal bulk of the light-modifying device is considerable and where it is thus difficult to place all of the components thereof adjacent a single image plane.

Where the source of light is other than monochromatic as, for example, where "white" light is utilized, an achromatization plate consisting of plane parallel individual conjugate and complementary portions of different thickness and/or dispersion for selectively modifying the phase of light of predetermined wave lengths may be positioned at plane 48 of Fig. 1. Such a plate would insure that the path difference between the undeviated and deviated light rays is substantially constant for all wave lengths. Similarly formed phase modifying plates capable of introducing color in the visible image could also be positioned at plane 48 for obtaining a relatively bright region of a specimen in a given color and, simultaneously, a relatively dark region in a contrasting color. In certain cases, it may also be desirable to provide a system with enhanced chromatic variation. Alternatively, it would be possible to provide conjugate and complementary portions of the light-modifying device itself wherein difference of thickness and dispersion between said portions were employed for the above-mentioned purposes of achromatization and introduction of color in the image.

It will be apparent that other modifications of the devices and optical systems above-described may be made in accordance with the general principles exemplified herein. Accordingly, such examples as have been generally presented are merely illustrative and the invention may be otherwise embodied and practiced within the scope of the following claims.

I claim:

1. An optical system for producing uninterrupted progressively variable phase contrast effects in an image of an object of relatively low contrast and of the type producing deviated and undeviated light rays, said optical system comprising means providing a light source of predetermined dimensions and contour adjacent an entrance pupil of said system, a condenser and an objective disposed at spaced locations along an optical axis of said system and optically aligned with said light source, said condenser and objective coacting to provide an image of said light source at an image plane adjacent the exit pupil of said condenser and objective combined, and light-modifying means positioned adjacent said image plane and disposed transversely relative to said optical axis and optically aligned with the condenser and objective so as to intercept substantially all of the deviated and undeviated light rays emanating from an object positioned at a predetermined object plane of said objective when said object is illuminated by said condenser and said light rays are transmitted by said objective, said light-modifying means comprising a plurality of transparent optical elements one of which is normally stationary and two of which are movable relative thereto, said movable optical elements each having a predetermined initial position located approximately transversely relative to said optical axis, said stationary optical element comprising a conjugate zonal portion being formed of transparent material which will appreciably modify one of the phase and amplitude characteristics of the light rays transmitted thereby, and having front and back substantially parallel transversely disposed optically aligned surfaces spaced a predetermined distance apart so as to provide in said conjugate zonal portion an optical path of predetermined value to light rays passing therethrough, said conjugate zonal portion being substantially geometrically similar in shape to the shape of said light source image adjacent said exit pupil and of such size and so located as to intercept substantially all of the undeviated light rays forming said image, each of said movable elements comprising a transversely disposed complementary zonal portion of such size and shape and so located when said movable elements are in said initial positions adjacent said image plane as to intercept the greater portion of said deviated light rays, said complementary zonal portions each having optically aligned front and back substantially parallel surfaces spaced predetermined distances from each other, each of said complementary zonal portions being formed of transparent material which will appreciably modify one of the phase and amplitude characteristics of the light rays transmitted thereby, so as to provide in each complementary zonal portion optical path values to the light rays passing therethrough when said movable elements are in their initial positions which are substantially equal to each other, and which are jointly substantially equal to the optical path value provided by said conjugate zonal portion, said movable optical elements being angularly adjustable relative to each other and relative to said optical axis, and means connected to said movable optical elements for simultaneously adjusting said movable optical elements predetermined amounts in opposite directions relative to said optical axis, thereby altering the effective optical path provided by said complementary zonal portions to light rays passing therethrough and toward a conjugate image plane of said objective, whereby alterations in contrast effects in an image of the said object formed by said deviated light rays at said conjugate image plane may be produced.

2. An optical system for producing uninterrupted progressively variable phase contrast effects in an image of an object of relatively low contrast and of the type producing deviated and undeviated light rays, said optical system comprising means providing a light source of predetermined dimensions and contour adjacent an entrance pupil of said system, a condenser and an objective disposed at spaced locations along an optical axis of said system and optically aligned with said light source, said condenser and objective coacting to provide an image of said light source at an image plane adjacent the exit pupil of said condenser and objective combined, and light-modifying means positioned adjacent said image plane and disposed transversely relative to said optical axis and optically aligned with the condenser and objective so as to intercept substantially all of the deviated and undeviated light rays emanating from an object positioned at a predetermined object plane of said objective when said object is illuminated by said condenser and said light rays are transmitted by said objective, said light-modifying means comprising a plurality of transparent optical elements one of which is normally stationary and two of which are movable relative thereto, said movable optical elements each having a predetermined initial position located approximately transversely relative to said optical axis, said stationary optical element comprising a conjugate zonal portion being formed of transparent material which will appreciably modify the phase characteristics of the light rays transmitted thereby, and having front and back substantially parallel transversely disposed optically aligned surfaces spaced a predetermined distance apart so as to provide in said conjugate zonal portion an optical path of predetermined value to light rays passing therethrough, said conjugate zonal portion being substantially geometrically similar in shape to the shape of said light source image adjacent said exit pupil and of such size and so located as to intercept substantially all of the undeviated light rays forming said image, each of said movable elements comprising a transversely disposed complementary zonal portion of such size and shape and so located when said movable elements are in said initial positions adjacent said image plane as to intercept the greater portion of said deviated light rays, said complementary zonal portions each having optically aligned front and back substantially parallel surfaces spaced predetermined distances from each other, each of said complementary zonal portions being formed of transparent material which will appreciably modify the phase characteristics of the light rays transmitted thereby, so as to provide in each complementary zonal portion optical path values to the light rays passing therethrough when said movable elements are in their initial positions which are substantially equal to each other, and which are jointly substantially equal to the optical path value provided by said conjugate zonal portions, said movable optical elements being angularly adjustable relative to each other and relative to said optical axis, and means connected to said movable optical elements for simultaneously adjusting said movable optical elements predetermined amounts in opposite directions relative to said optical axis, thereby altering the effective optical path provided by said complementary zonal portions to light rays passing therethrough and toward a conjugate image plane of said objective, whereby alterations in contrast effects in an image of the said object formed by said deviated light rays at said conjugate image plane may be produced.

3. An optical system for producing uninterrupted progressively variable phase contrast effects in an image of an object of relatively low contrast and of the type producing deviated and undeviated light rays, said optical system comprising means providing a light source of predetermined dimensions and contour adjacent an entrance pupil of said system, a condenser and an objective disposed at spaced locations along an optical axis of said system and optically aligned with said light source, said condenser and objective coacting to provide an image of said light source at an image plane adjacent the exit pupil of said condenser and objective combined, and light-modifying means positioned adjacent said image plane and disposed transversely relative to said optical axis and optically aligned with the condenser and objective so as to intercept substantially all of the deviated and undeviated light rays emanating from an object positioned at a predetermined object plane of said objective when said object is illuminated by said condenser and said light rays are transmitted by said objective, said light-modifying means comprising a plurality of transparent optical elements one of which is normally stationary and two of which are movable relative thereto, said movable optical elements each having a predetermined initial position located approximately transversely relative to said optical axis, said stationary optical element comprising a conjugate zonal portion being formed of transparent material which will appreciably modify the amplitude characteristics of the light rays transmitted thereby, and having front and back substantially parallel transversely disposed optically aligned surfaces spaced a predetermined distance apart so as to provide in said conjugate zonal portion an optical path of predetermined value to light rays passing therethrough, said conjugate zonal portion being substantially geometrically similar in shape to the shape of said light source image adjacent said exit pupil and of such size and so located as to intercept substantially all of the undeviated light rays forming said image, each of said movable elements comprising a transversely disposed complementary zonal portion of such size and shape and so located when said movable elements are in said initial positions adjacent said image plane as to intercept the greater portion of said deviated light rays, said complementary zonal portions each having optically aligned front and back substantially parallel surfaces spaced predetermined distances from each other, each of said complementary zonal portions being formed of transparent material which will appreciably modify the amplitude characteristics of the light rays transmitted thereby, so as to provide in each complementary zonal portion optical path values to the light rays passing therethrough when said movable elements are in their initial positions which are substantially equal to each other, and which are jointly substantially equal to the optical path value provided by said conjugate zonal portion, said movable optical elements being angularly adjustable relative to each other and relative to said optical axis, and means connected to said movable optical elements for simultaneously adjusting said movable optical elements predetermined amounts in opposite directions relative to said optical axis, thereby altering the effective optical path provided by said complementary zonal portions to light rays passing therethrough and toward a conjugate image plane of said objective, whereby alterations in contrast effects in an image of the said object formed by said deviated light rays at said conjugate image plane may be produced.

4. An optical system for producing uninterrupted progressively variable phase contrast effects in an image of an object of relatively low contrast and of the type producing deviated and undeviated light rays, said optical system comprising means providing a light source of predetermined dimensions and contour adjacent an entrance pupil of said system, a condenser and an objective disposed at spaced locations along an optical axis of said system and optically aligned with said light source, said condenser and objective coacting to provide an image of said light source at an image plane adjacent the exit pupil of said condenser and objective combined, and light-modifying means positioned adjacent said image plane and disposed transversely relative to said optical axis and optically aligned with the condenser and objective so as to intercept substantially all of the deviated and undeviated light rays emanating from an object positioned at a predetermined object plane of said objective when said objective is illuminated by said condenser and said light rays are transmitted by said objective, said light-modifying means comprising a plurality of transparent optical elements one of which is normally stationary and two of which are movable relative thereto, said movable optical elements each having a predetermined initial position located approximately transversely relative to said optical axis, said stationary optical element comprising a conjugate zonal portion being formed of transparent material which will appreciably modify one of the phase and amplitude characteristics of the light rays transmitted thereby, and having front and back substantially parallel transversely disposed optically aligned surfaces spaced a predetermined distance apart so as to provide in said conjugate zonal portion an optical path of predetermined value to light rays passing therethrough, said conjugate zonal portion being substantially geometrically similar in shape to the shape of said light source image adjacent said exit pupil and of such size and so located as to intercept substantially all of the undeviated light rays forming said image, each of said movable elements comprising a transversely disposed complementary zonal portion of such size and shape and so located when said movable elements are in said initial positions adjacent said image plane as to intercept the greater portion of said deviated light rays, said complementary zonal portions each having optically aligned front and back substantially parallel surfaces spaced predetermined distances from each other, each of such complementary zonal portions being formed of transparent material which will appreciably modify one of the phase and amplitude characteristics of the light rays transmitted thereby, so as to provide in each complementary zonal portion an optical path value to the light rays passing therethrough when said movable elements are in their initial positions which are substantially equal to each other, and which are jointly substantially equal to the optical path value provided by said conjugate zonal portion, said movable optical elements being tiltable about substantially parallel spaced axes extending approximately through the centers of said movable optical elements and transversely relative to said optical axis so as to be angularly adjustable relative to each other and relative to said optical axis, and means connected to said movable optical elements for simultaneously adjusting said movable optical elements predetermined amounts in opposite directions relative to said optical axis, thereby altering the effective optical path provided by said complementary zonal portions to light rays passing therethrough and toward a conjugate image plane of said objective, whereby alterations in contrast effects in an image of the said object formed by said deviated light rays at said conjugate image plane may be produced.

5. Light-modifying means for use in a phase contrast optical system comprises means providing a light source of predetermined dimensions and contour adjacent an entrance pupil of said system, a condenser, an objective disposed in optical alignment with said light source for providing an image of said light source at an image plane adjacent the exit pupil of said system, said light-modifying means being arranged to be positioned adjacent said image plane and optically aligned with the condenser and objective so as to intercept substantially all of the deviated and undeviated light rays emanating from an object positioned at the object plane of said objective, said light-modifying means comprising a plurality of transparent optical elements one of which is normally stationary and two of which are movable relative thereto, said movable optical elements each having a predetermined initial position located approximately transversely relative to an optical axis extending therethrough, said stationary optical element comprising a conjugate zonal portion formed of transparent material which will appreciably modify one of the phase and amplitude characteristics of the light rays transmitted thereby, and having front and back substantially parallel transversely disposed optically aligned surfaces spaced a predetermined distance apart so as to provide in said conjugate zonal portion an optical path of predetermined value to light rays passing therethrough, said conjugate zonal portion being substantially geometrically similar in shape to the shape of said light source image adjacent said exit pupil and of such size and so located as to intercept substantially all of the undeviated light rays forming said image, each of said movable elements comprising a transversely disposed complementary zonal portion of such size and shape and so located when said movable elements are in said initial positions as to intercept the greater portion of said deviated light rays, said complementary zonal portions each having optically aligned front and back substantially parallel surfaces spaced predetermined distances from each other, each of said complementary zonal portions being formed of transparent material which will appreciably modify one of the phase and amplitude characteristics of the light rays transmitted thereby, so as to provide in each complementary zonal portion optical path values to the light rays passing therethrough when said movable elements are in their initial positions which are substantially equal to each other, and which are jointly substantially equal to the optical path value provided by said conjugate zonal portion, said movable optical elements being angularly adjustable relative to each other and relative to said optical axis, and means connected to said movable optical elements for simultaneously adjusting said movable optical elements predetermined amounts in opposite directions relative to said stationary member.

6. Light-modifying means for use in a phase contrast optical system comprises means providing a light source of predetermined dimensions and contour adjacent an entrance pupil of said system, a condenser, an objective disposed in optical alignment with said light source for providing an image of said light source at an image plane adjacent the exit pupil of said system, said light-modifying means being arranged to be positioned adjacent said image plane and optically aligned with the condenser and objective so as to intercept substantially all of the deviated and undeviated light rays emanating from an object positioned at the object plane of said objective, said light-modifying means comprising a plurality of transparent optical elements one of which is normally stationary and two of which are movable relative thereto, said movable optical elements each having a predetermined initial position located approximately transversely relative to an optical axis extending therethrough, said stationary optical element comprising a conjugate zonal portion formed of transparent material which will appreciably modify the phase characteristics of the light rays transmitted thereby, and having front and back substantially parallel transversely disposed optically aligned surfaces spaced a predetermined distance apart so as to provide in said conjugate zonal portion an optical path of predetermined value to light rays passing therethrough, said conjugate zonal portion being substantially geometrically similar in shape to the shape of said light source image adjacent said exit pupil and of such size and so located as to intercept substantially all of the undeviated light rays forming said image, each of said movable elements comprising a transversely disposed complementary zonal portion of such size and shape and so located when said movable elements are in said initial positions as to intercept the greater portion of said deviated light rays, said complementary zonal portions each having optically aligned front and back substantially parallel surfaces spaced predetermined distances from each other, each of said complementary zonal portions being formed of transparent material which will appreciably modify the phase characteristics of the light rays transmitted thereby, so as to provide in each complementary zonal portion optical path values to the light rays passing therethrough when said movable elements are in their initial positions which are substantially equal to each other, and which are jointly substantially equal to the optical path value provided by said conjugate zonal portion, said movable optical elements being angularly adjustable relative to each other and relative to said optical axis, an means connected to said movable optical elements for simultaneously adjusting said movable optical elements predetermined amounts in opposite directions relative to said stationary member.

7. Light-modifying means for use in a phase contrast optical system comprises means providing a light source of predetermined dimensions and contour adjacent an entrance pupil of said system, a condenser, an objective disposed in optical alignment with said light source for providing an image of said light source at an image plane adjacent the exit pupil of said system, said light-modifying means being arranged to be positioned adjacent said image plane and optically aligned with the condenser and objective so as to intercept substantially all of the deviated and undeviated light rays emanating from an object positioned at the object plane of said objective, said light-modifying means comprising a plurality of transparent optical elements one of which is normally stationary and two of which are movable relative thereto, said movable optical elements each having a predetermined initial position located approximately transversely relative to an optical axis extending therethrough, said stationary optical element comprising a conjugate zonal portion formed of transparent material which will appreciably modify the amplitude characteristics of the light rays transmitted thereby, and having front and back substantially parallel transversely disposed optically aligned surfaces spaced a predetermined distance apart so as to provide in said conjugate zonal portion an optical path of predetermined value to light rays passing therethrough, said conjugate zonal portion being substantially geometrically similar in shape to the shape of said light source image adjacent said exit pupil and of such size and so located as to intercept substantially all of the undeviated light rays forming said image, each of said movable elements comprising a transversely disposed complementary zonal portion of such size and shape and so located when said movable elements are in said initial positions as to intercept the greater portion of said deviated light rays, said complementary zonal portions each having optically aligned front and back substantially parallel surfaces spaced predetermined distances from each other, each of said complementary zonal portions being formed of transparent material which will appreciably modify the amplitude characteristics of the light rays transmitted thereby, so as to provide in each complementary zonal portion optical path values to the light rays passing therethrough when said movable elements are in their initial positions which are substantially equal to each other, and which are jointly substantially equal to the optical path value provided by said conjugate zonal portion, said movable optical elements being angularly adjustable relative to each other and relative to said optical axis, and means connected to said movable optical elements for simultaneously adjusting said movable optical elements predetermined amounts in opposite directions relative to said stationary member.

8. Light-modifying means for use in a phase contrast optical system comprises means providing a light source of predetermined dimensions and contour adjacent an entrance pupil of said system, a condenser, an objective disposed in optical alignment with said light source for providing an image of said light source at an image plane adjacent the exit pupil of said system, said light-modifying means being arranged to be positioned adjacent said image plane and optically aligned with the condenser and objective so as to intercept substantially all of the deviated and undeviated light rays emanating from an object positioned at the object plane of said objective, said light-modifying means comprising a plurality of transparent optical elements one of which is normally stationary and two of which are movable relative thereto, said movable optical elements each having a predetermined initial position located approximately transversely relative to an optical axis extending therethrough, said stationary optical element comprising a conjugate zonal portion formed of transparent material which will appreciably modify one of the phase and amplitude characteristics of the light rays transmitted thereby, and having front and back substantially parallel transversely disposed optically aligned surfaces spaced a predetermined distance apart so as to provide in said conjugate zonal portion an optical path of predetermined value to light rays passing therethrough, said conjugate zonal portion being substantially geometrically similar in shape to the shape of said light source image adjacent said exit pupil and of such size and so located as to intercept substantially all of the undeviated light rays forming said image, each of said movable elements comprising a transversely disposed complementary zonal portion of such size and shape and so located when said movable elements are in said initial positions as to intercept the greater portion of said deviated light rays, said complementary zonal portions each having optically aligned front and back substantially parallel surfaces spaced predetermined distances from each other, each of said complementary zonal portions being formed of transparent material which will appreciably modify one of the phase and amplitude characteristics of the light rays transmitted thereby, so as to provide in each complementary zonal portion optical path values to the light rays passing therethrough when said movable elements are in their initial positions which are substantially equal to each other, and which are jointly substantially equal to the optical path value provided by said conjugate zonal portion, said movable optical elements being tiltable about substantially parallel spaced axes extending approximately through the centers of said movable optical elements and transversely relative to said optical axis so as to be angularly adjustable relative to each other and relative to said optical axis, and means connected to said movable optical elements for simultaneously adjusting said movable optical elements predetermined amounts in opposite directions relative to said stationary member.

EDGAR D. TILLYER.

References Cited in the file of this patent

UNITED STATES PATENTS

| Number | Name | Date |
|---|---|---|
| 818,553 | Phillips | Apr. 24, 1906 |
| 2,079,621 | Land | May 11, 1937 |
| 2,105,671 | Roesch | Jan. 18, 1938 |
| 2,418,602 | Richards | Apr. 8, 1947 |
| 2,427,689 | Osterberg et al. | Sept. 23, 1947 |
| 2,516,905 | Osterberg et al. | Aug. 1, 1950 |